United States Patent
Kraemer et al.

(10) Patent No.: US 7,607,041 B2
(45) Date of Patent: Oct. 20, 2009

(54) METHODS AND APPARATUS PROVIDING RECOVERY FROM COMPUTER AND NETWORK SECURITY ATTACKS

(75) Inventors: Jeffrey A. Kraemer, Wellesley, MA (US); Andrew Zawadowskiy, Nashua, NH (US); Boris Ruchansky, Wayland, MA (US)

(73) Assignee: Cisco Technology, Inc., San Jose, CA (US)

( * ) Notice: Subject to any disclaimer, the term of this patent is extended or adjusted under 35 U.S.C. 154(b) by 438 days.

(21) Appl. No.: 11/414,810

(22) Filed: May 1, 2006

(65) Prior Publication Data

US 2007/0174912 A1 Jul. 26, 2007

Related U.S. Application Data

(60) Provisional application No. 60/751,439, filed on Dec. 16, 2005.

(51) Int. Cl.
*G06F 11/00* (2006.01)

(52) U.S. Cl. ......................................... 714/15
(58) Field of Classification Search .................... 714/15
See application file for complete search history.

(56) References Cited

U.S. PATENT DOCUMENTS

| 2005/0166001 | A1* | 7/2005 | Conover et al. | 711/100 |
| 2005/0235164 | A1* | 10/2005 | Gassoway | 713/193 |
| 2006/0059486 | A1* | 3/2006 | Loh et al. | 718/100 |
| 2006/0161821 | A1* | 7/2006 | Oshins et al. | 714/52 |
| 2007/0089088 | A1* | 4/2007 | Borde et al. | 717/106 |

* cited by examiner

*Primary Examiner*—Scott T Baderman
*Assistant Examiner*—Jigar Patel

(57) ABSTRACT

A system creates a secondary stack containing execution information of at least one function operating on the computer system, and receives an attack notification of an attack on the computer system. The system determines a point in the secondary stack at which a recovery from the attack is possible. In one embodiment, the system then generates a signature of the attack based on the execution information contained within the secondary stack.

14 Claims, 7 Drawing Sheets

204 CREATE A SECONDARY STACK CONTAINING EXECUTION INFORMATION OF AT LEAST ONE FUNCTION OPERATING ON THE COMPUTER SYSTEM

205 INSERT A NOTIFYING IDENTIFIER IN THE AT LEAST ONE FUNCTION OPERATING ON THE COMPUTER SYSTEM, THE NOTIFYING IDENTIFIER PROVIDING EXECUTION INFORMATION TO THE SECONDARY STACK, THE EXECUTION INFORMATION ASSOCIATED WITH THE AT LEAST ONE FUNCTION

206 RECEIVE EXECUTION INFORMATION FROM THE NOTIFYING IDENTIFIER THAT THE AT LEAST ONE FUNCTION HAS BEGUN EXECUTION AT AN ENTRY POINT IN THE AT LEAST ONE FUNCTION

207 CAPTURE THE EXECUTION INFORMATION FROM THE AT LEAST ONE FUNCTION

208 CAPTURE THE EXECUTION INFORMATION INCLUDING AT LEAST ONE OF:
i) A STATE OF AT LEAST ONE REGISTER ASSOCIATED WITH THE COMPUTER SYSTEM
ii) A HASH OF A CURRENT STATE OF A PRIMARY STACK
iii) A RETURN ADDRESS ASSOCIATED WITH THE AT LEAST ONE FUNCTION PROVIDING THE NOTIFYING IDENTIFIER

209 STORE THE EXECUTION INFORMATION FROM THE AT LEAST ONE FUNCTION

OR

210 PUSH THE EXECUTION INFORMATION ONTO THE SECONDARY STACK

*FIG. 4*

214 DETERMINE A POINT IN THE SECONDARY STACK AT WHICH A RECOVERY FROM THE ATTACK IS POSSIBLE

215 TRAVERSE THE SECONDARY STACK TO RETRIEVE THE EXECUTION INFORMATION CONTAINED WITHIN THE SECONDARY STACK

216 IDENTIFY THE SECONDARY STACK CONTAINS CORRUPTED FUNCTION INFORMATION

↓

217 DETERMINE A SAFE ENTRY POINT IN THE SECONDARY STACK AT WHICH TO BEGIN EXECUTION OF A SECOND FUNCTION, THE SECOND FUNCTION NOT ASSOCIATED WITH THE CORRUPTED INFORMATION CONTAINED WITHIN THE SECONDARY STACK

OR

218 UTILIZE THE EXECUTION INFORMATION TO DETERMINE A SAFE ENTRY POINT IN THE SECONDARY STACK AT WHICH TO BEGIN EXECUTION OF THE AT LEAST ONE FUNCTION

*FIG. 6*

219 GENERATE A SIGNATURE OF THE ATTACK BASED ON THE EXECUTION INFORMATION CONTAINED WITHIN THE SECONDARY STACK

220 IDENTIFY THE ATTACK OCCURRED DURING EXECUTION OF THE AT LEAST ONE FUNCTION

221 OBTAIN EXECUTION INFORMATION TO BE USED TO GENERATE THE SIGNATURE

222 GENERATE A SIGNATURE OF THE ATTACK, THE SIGNATURE OF THE ATTACK IDENTIFYING THE AT LEAST ONE FUNCTION AS THE ORIGIN OF THE ATTACK

*FIG. 7*

METHODS AND APPARATUS PROVIDING RECOVERY FROM COMPUTER AND NETWORK SECURITY ATTACKS

CROSS REFERENCE TO RELATED APPLICATIONS

The present application claims the benefit of U.S. Provisional Patent Application No. 60/751,439, filed on Dec. 16, 2005, which is incorporated herein by reference.

BACKGROUND

Computer systems, networks and data centers are exposed to a constant and differing variety of attacks that expose vulnerabilities of such systems in order to compromise their security and/or operation. As an example, various forms of malicious software program attacks include viruses, worms, Trojan horses and the like that computer systems can obtain over a network such as the Internet. Quite often, users of such computer systems are not even aware that such malicious programs have been obtained within the computer system. Once resident within a computer, a malicious program that executes might disrupt operation of the computer to a point of inoperability and/or might spread itself to other computers within a network or data center by exploiting vulnerabilities of the computer's operating system or resident application programs. Other malicious programs might operate within a computer to secretly extract and transmit information within the computer to remote computer systems for various suspect purposes. As an example, spyware is a form of software that can execute in the background (e.g., unbeknownst to users) of a computer system and can perform undesirable processing operations such as tracking, recording and transmitting user input from the spyware-resident computer system to a remote computer system. Spyware can allow remote computes to silently obtain otherwise confidential information such as usernames and passwords required to access protected data, lists, contents of files or even remote web sites user account information.

Computer system developers, software developers and security experts have created many types of conventional preventive measures that operate within conventional computer systems in an attempt to prevent operation of malicious programs from stealing information or from compromising proper operation of the computer systems. As an example, conventional virus detection software operates to periodically download a set of virus definitions from a remotely located server. Once the virus detection software obtains the definitions, the security software can monitor incoming data received by the computer system, such as email messages containing attachments, to identify viruses defined within the virus definitions that might be present within the data accessed by the computer. Such data might be obtained over a network or might be unknowingly resident on a computer readable medium, such as a disk or CD-ROM, that a user inserts into the computer. Upon detection of inbound data containing a virus or other malicious program, the virus detection software can quarantine the inbound data so that a user of the computer system will not execute code or access the data containing the detected virus that might result in compromising the computer's operation.

Other examples of conventional malicious attacks, intrusions, or undesirable processing that can cause problems within computer systems or even entire computer networks include virus attacks, worm attacks, trojan horse attacks, denial-of-service attacks, a buffer overflow operations, execution of malformed application data, and execution of malicious mobile code. Virus attacks, worm attacks, and trojan horse attacks are variants of each other that generally involve the execution of a program, for which a user often is unaware of its existence, that performs some undesired processing operations to comprise a computer's proper operation. A denial-of-service attack operates to provide an intentional simultaneous barrage of packets (e.g., many connection attempts) emanating from many different computer systems to one or more target computer systems, such as a web site, in order to intentionally cause an overload in processing capabilities of the target computer resulting in disruption of service or a business function provided by the target computer. Denial of Service attacks may also seek to crash the targeted machine (rather than simply consume resources). Buffer overflow attacks occur when programs do not provide appropriate checks of data stored in internal data structures within the software that result in overwriting surrounding areas of memory. Attacks based on buffer overflows might allow an attacker to execute arbitrary code on the target system to invoke privileged access, destroy data, or perform other undesirable functions. Malformed application data attacks might result in an application containing a code section that, if executed, provides access to resources that would otherwise be private to the application. Such attacks can expose vulnerabilities due to an incorrect implementation of the application, for example by failing to provide appropriate data validity checks, or allowing data stream parsing errors, and the like.

Many of the conventional malicious programs and mechanisms for attack of computer systems, such as viruses and worms, include the ability to redistribute themselves to other computer systems or devices within a computer network, such that several computers become infected and experience the malicious processing activities discussed above. Some conventional attempts to prevent redistribution of malicious programs include implementing malicious program detection mechanisms such as virus detection software within firewalls or gateways between different portions of networked computer systems in order to halt propagation of malicious programs to sub-networks.

SUMMARY

Conventional technologies for providing computer security suffer from a variety of deficiencies. In particular, conventional technologies for providing computer security are limited in that conventional security software programs rely on the ability to periodically remotely receive information such as virus definitions that allow the conventional security software programs to identify and quarantine malicious programs. Many of the most common conventional forms of security software such as virus definitions programs rely upon obtaining the periodic virus definition updates from a centralized server accessed over the Internet that is maintained by the vendor of the security software. As a result, the most recent virus definition updates only reflects those viruses that have been recently detected, fingerprinted in inserted into the virus definition file by the vendor of that maintains and distributes the virus definition files.

Because conventional security software programs require periodic updates, such conventional security software programs are only as good as the most recent updates of the malicious program definitions (e.g., virus definitions) that individual instances of the conventional protection software have been able to receive. As an example, conventional virus detection software will not recognize viruses created and transmitted to a computer system that have not yet been identified and/or defined within the most recent update of a set of virus definitions obtained from a remote server. Accordingly, the malicious program code or data not defined within the most recent virus definitions update may be successfully inserted and executed within computer systems in a network in order to perform some of the malicious processing discussed above, even though such systems are equipped with conventional security software (i.e., virus detection software).

As a result, conventional security software program implementations are often several steps behind the prevention and spread of new attacks that are constantly being created and disseminated by malicious program developers. This problem is compounded by the fact that modem malicious programs are able to distribute themselves quickly to hundreds or thousands of computer systems on a network such as the Internet within a short amount of time, such as several hours, whereas most conventional security software only obtains updates on a less frequent basis, such as nightly. Additionally, modem malicious programs can modify themselves to appear to be a new attack (called a "Day Zero" attack because this is the first time the attack appears on the network) each time the malicious program runs. These malicious programs are known as polymorphic attacks for their ability to appear to be a "Day Zero" attack each time they execute.

Embodiments disclosed herein significantly overcome such deficiencies and provide a system that includes an exploited process recovery technique. It should be noted that the exploited process recovery technique could also be an exploited process recovery algorithm or an exploited process recovery process. The exploited process recovery technique rapidly identifies malicious attacks. In one embodiment, the exploited process recovery technique prevents the spread of such attacks to other computer systems. In effect, embodiments disclosed herein provide for a self-healing computer network system. Embodiments disclosed herein include one or more security agents that operate within individual host computer systems in a network. The security agents can interact with a management center to obtain a security policy that contains a set of rules that indicate types of operations that may be allowed or disallowed within computer system. Once a security agent has obtained the security policy, the security agent operates a plurality of security interceptors that can watch over and monitor processing operations performed by various software and hardware components within the host computer system which that security agent protects. The security agent provides security to a computerized device by detecting processing outcomes produced via operation of a sequence of related processing operations within the computerized device. As an example, processing operations related to an inbound connection to a Web server can be monitored by various interceptors operating within different parts of the computer system's operating system and application layer code in order to detect the related sequence of processing operations that the inbound Web server connection attempt triggers. Each interceptor detects a specific event and transfers that event to an event correlation engine that records the processing outcomes and the sequence of related processing operations in a security history. The event correlation engine identifies a security violation when one of the detected processing operations in the security history produces a processing outcome that violates a security policy. This may be before, during or after occurrence of an undesired processing outcome within computer system such as a system crash, system error, protection violation, process disruption or other such undesired action as defined within the security policy.

The security agent is then able to subsequently detect attempted performance of a similar sequence of related processing operations that attempt to produce at least one processing outcome that violates the security policy. In response, the security agent denies operation of at least a portion of the sequence of related processing operations within the computerized device to avoid violation of the security policy. The security agents can also mark or otherwise identify sequences of processing operations that led up to the security violation as a disallowed sequence of processing operations and can disseminate this information to other security agents operating on other host computer systems in the network in real-time (e.g., upon detection) in order to spread the knowledge of the behavior or processing pattern that the malicious attack attempted to perform on the computer system the detected the attack, so that other computer systems will not be vulnerable to the attack.

Embodiments disclosed herein significantly overcome such deficiencies and provide a system that includes an exploited process recovery technique for a computer system. The exploited process recovery technique creates a secondary stack that shadows the primary process stack. The exploited process recovery technique inserts hooks into functions such that the entry points of those functions provide the secondary stack with a mark in the secondary stack indicating a safe return point. As the computer system operates, the execution of the 'hooked' functions provides entry point and exit point data to the secondary stack. When an exception (caused as a result of an attack) or attack occurs on the computer system, the exploited process recovery technique unwinds the stack to find a safe entry point for the computer system to resume processing. Information provided by the secondary stack can provide information for generating a signature for the attack, in some cases.

Embodiments disclosed herein provide a system that includes an exploited process recovery technique for a computer system. The exploited process recovery technique creates a secondary stack containing execution information of at least one function operating on the computer system. The exploited process recovery technique receives an attack notification of an attack on the computer system, and determines a point in the secondary stack at which a recovery from the attack is possible. In one embodiment, the exploited process recovery technique generates a signature of the attack, based on the execution information contained within the secondary stack.

During an example operation of one embodiment, suppose the exploited process recovery technique monitors a computer system. The exploited process recovery technique provides hooks to commonly used functions. Those hooks identify entry points to the functions, and provide data regarding the state of the system at the time of entry to the functions. The exploited process recovery technique creates a secondary stack that shadows the operations of the primary process stack. That is, the secondary stack operates in conjunction with the primary process stack. As the computer system operates, calls to the functions produce data that is pushed onto the secondary stack. When the functions complete, that data is popped off the secondary stack. When an attack occurs on the computer system, the exploited process recovery technique unwinds the secondary stack to a point of safe recovery for the computer system. In one embodiment, the point of safe recovery is the entry point to the function at which the attack occurred. In another embodiment, the point of safe recovery is a point prior to the entry point of the function at which the attack occurred. In another example embodiment, the data in the secondary stack provides the exploited process recovery technique with information for generating a signature to prevent future instances of this attack.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 4 illustrates a flowchart of a procedure performed by the system of FIG. 1 when the exploited process recovery technique creates a secondary stack, and inserts a notifying identifier in the at least one function operating on the computer system, according to one embodiment disclosed herein.

FIG. 6 illustrates a flowchart of a procedure performed by the system of FIG. 1 when the exploited process recovery technique determines a point in the secondary stack at which a recovery from the attack is possible, according to one embodiment disclosed herein.

FIG. 7 illustrates a flowchart of a procedure performed by the system of FIG. 1 when the exploited process recovery technique generates a signature of the attack based on the execution information contained within the secondary stack, according to one embodiment disclosed herein.

DETAILED DESCRIPTION

Embodiments disclosed herein provide a system that includes an exploited process recovery technique for a computer system. The exploited process recovery technique creates a secondary stack that shadows the primary process stack. The exploited process recovery technique inserts hooks into functions such that the entry points of those functions provide the secondary stack with a mark in the secondary stack indicating a safe return point. As the computer system operates, the execution of the 'hooked' functions provides entry point and exit point data to the secondary stack. When an exception or attack occurs on the computer system, the exploited process recovery technique unwinds the stack to find a safe entry point for the computer system to resume processing. Information provided by the secondary stack can provide information for generating a signature for the attack, in some cases. In an example embodiment, the exploited process recovery technique identifies the attack at the entry point of the attack, such as an entry point to a function. In another example embodiment, the attack travels throughout the network stack before the attack is identified. In this example, when the exploited process recovery technique unwinds the stack to find a safe entry point for the computer system to resume processing, the safe entry point may or may not be the actual entry point for the attack.

Embodiments disclosed herein provide a system that includes an exploited process recovery technique for a computer system. The exploited process recovery technique creates a secondary stack containing execution information of at least one function operating on the computer system. The exploited process recovery technique receives an attack notification of an attack on the computer system, and determines a point in the secondary stack at which a recovery from the attack is possible. In one embodiment, the exploited process recovery technique generates a signature of the attack, based on the execution information contained within the secondary stack.

Figure 1:
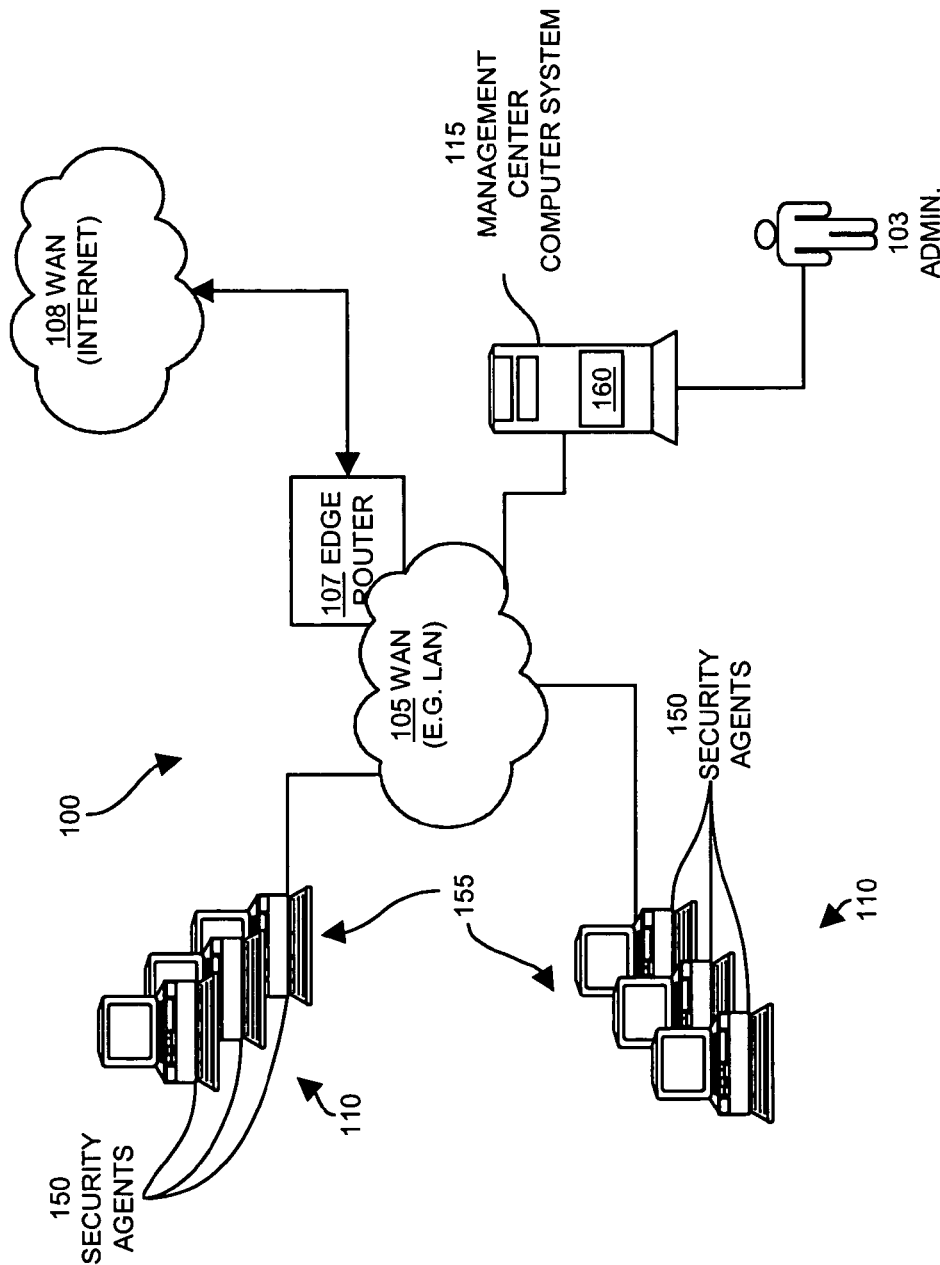
FIG. 1 illustrates an example configuration of a network environment that includes a security system configured as disclosed herein.

FIG. 1 illustrates an example computer networking environment 100 suitable for use in explaining example embodiments disclosed herein. The computer networking environment 100 includes a computer network 105 such as a local area network (LAN) that interconnects a security management computer system 115, an edge router 107 and a plurality of host computer systems 110, each of which operates (e.g., executes, runs, interprets or otherwise performs) an agent 150 configured as disclosed herein. Each agent 150 is running an instance of the exploited process recovery technique 155. The security management computer system 115 also operates a management center application 160 that operates as disclosed herein. The edge router 107 couples the network 105 to a wide area network (WAN) 108 such as the Internet that allows communication between the computer systems 110, 115 and other computers worldwide. Note that the management center computer 115 may be isolated form the WAN 108 by a firewall that is not shown in this example.

The host computers 110 may be any type of computer system, workstation, server (e.g., web server), personal computer, laptop, mainframe, personal digital assistant device, general purpose or dedicated computing device or the like that operate any type of software, firmware or operating system. They may be physically or wirelessly coupled to the network 105 to support communications. The security agents 150 and management center application 160 operate to dynamically detect and prevent malicious attacks on the computers 110 without requiring the security agents 150 to continuously and periodically download signature or virus definition files. Generally, an administrator 103 installs the security agents 150 (including the exploited process recovery technique 155) on the computer systems 110 that are to be protected and they are responsible for enforcing the appropriate security policy on those systems.

The security agents 150 (including the exploited process recovery technique 155) have the ability to learn what causes security violations such as malicious attacks by monitoring, analyzing and recording processing behavior and events of the computer system 110 that occur prior to the security violation taking place, in order to prevent such events from occurring in the future. In other words, the security system disclosed herein in able to monitor and record processing behavior that results in an undesired processing operation such as a process exception, system crash or the like and is able to analyze recorded processing operations that led up to undesired operation or problem to identify the root cause of the failure. Once identified, the security system is able to prevent that single operation or sequence of processing operations identified as the root cause of failure from executing again on that or other computer system in order to avoid further security violations and to prevent such attacks on other computers. A security agent as disclosed herein can thus learn of new types of malicious attacks without having seen processing that causes such attacks in the past, and can prevent that attack in the future. The ability to learn of processing associated with a new attack, identify its root cause, and prevent it from happening in the future can occur without external input (e.g., virus definition files) being received by a computer system equipped with the security agent.

Security agent operation as explained herein includes being preprogrammed with certain known security violations in a rule-based security policy and preventing them from happening even a first time. In addition, such processing also involves recording and post-processing security history event data that result in a security violation (i.e., that was not preprogrammed and thus unrecognizable a first time) to identify a root cause (e.g., one or more processing operations or events) of the security violation within the computer system in order to prevent it from happening a second time. This can involve performing a local comparison of several security histories collected by a agent 150 in a single computer system 110 to identify a common pattern of processing activity that results in an undesirable processing outcome (i.e., a security violation). The security agents 150 can also transmit event and security history information to the management center 115.

The management center 115 acts as a central repository for all event log records generated by the security agents 150 and provides functions for monitoring and reporting. The management center 115 also correlates event records generated from security agents 150 operating on different computer systems 110 for purposes of detecting suspicious activity in the network.

Figure 2:
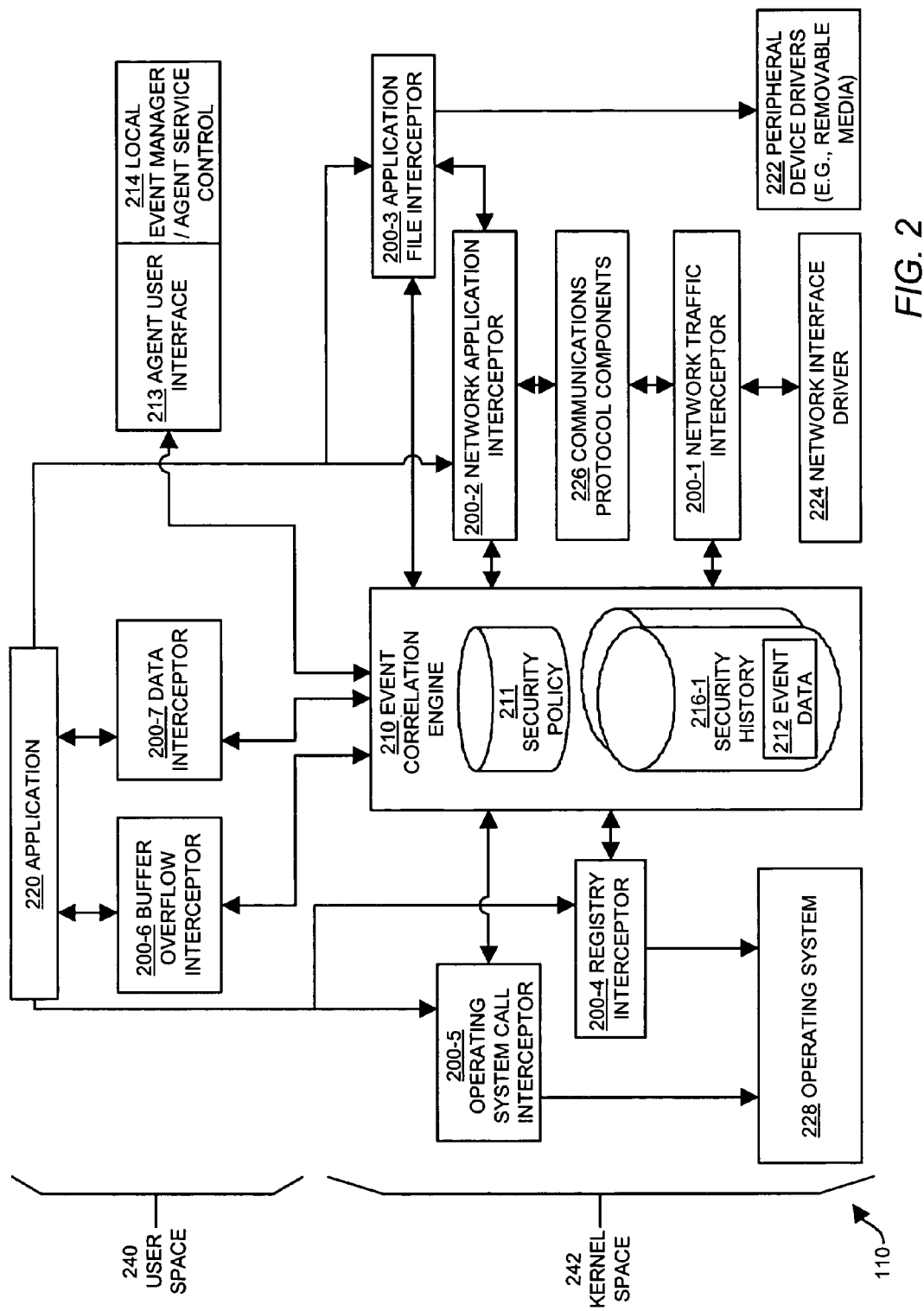
FIG. 2 illustrates example architecture of the computerized device configured with a security system in one example configuration.

FIG. 2 illustrates an architecture of a host computer system 110 configured with a security agent in accordance with one example embodiment. The security agent components include a plurality of security interceptors 200-1 through 200-7 including, for example, a network traffic interceptor 200-1, the network application interceptor 200-2, a file interceptor 200-3, a registry interceptor 200-4, a system call interceptor 200-5, a buffer overflow interceptor 200-6 and a data interceptor 200-7. The agent 150 in this example configuration also includes an event correlation engine 210, a security agent user interface 213, and local event manager 214. The event correlation engine 210 stores a security policy 211 that contains rules that are used to instruct the agent 150 to protect the computer 110 on which it operates by interpreting and enforcing the rules to restrict the operations that may be performed by that computer 110. An administrator 103 uses the management center application 160 to create and distribute security policies to each computer system 110 to be protected.

In one configuration, the network traffic interceptor 200-1 resides between a communications protocol component 226 (such as a TCP driver), and the network interface card 224 or other communications interface. The network traffic interceptor 200-1 looks at packets coming from the network before they get to the native operating system TCP stack and can detect malicious operations or instructions such as a remote computer scanning the computer system 110. Such attacks can include, for example, a ping of death attack, a TCP SYN flood attack, port scanning attacks and so froth. Other security interceptors 200 can include packet interceptors, connection interceptors, file sharing interceptors, data filter interceptors, registry interceptors, system call interceptors, and the like. The interceptors 200 can be installed and executed by using, for example, windows registry keys that create dependencies on standard Operating System (OS) dynamically linked libraries (dlls) so that the interceptor dlls 200 are loaded along with the appropriate windows dlls that they monitor. The interceptors can thus serve as wrappers to monitor processing operations of all calls made to any specific computer components.

This example configuration also includes several components that operate within the computer system 110 that are not part of the security agent architecture itself. In particular, this example configuration includes one or more software applications 220 that execute within a user space 240 within the computer system 110. The computer system 110 further operates several components in kernel space 242 such as one or more device peripheral device drivers 222, a network interface driver 224, communications protocol components 226, and an operating system 228. It is to be understood that the components 222 through 228 are illustrated as separate for purposes of description of operations disclosed herein, and that they may be combined together, such as an operating system that includes device drivers 222 and communication protocol components 226.

Generally, according to operations of embodiments disclosed herein, the interceptors 200 monitor processing activities and collect and report event data 212 to the event correlation engine 210 for the respective standard processing components 220 through 228 within the user and kernel spaces 240 and 242. The event correlation engine 210 stores the event data within one or more security histories 216. Event data 212 can include things such as the identification of new connection requests made to the network interface driver 224, as detected by the network traffic interceptor 200-1. As another example, the application file interceptor 200-3 can identify a processing activity such as an application 220 accessing a particular file via an operating system call and report this as event data 212 to the event correlation engine 210. There may be other interceptors 200 besides those illustrated in FIG. 2 and thus the interceptors 201 through 206 are shown by way of example only. The event correlation engine 210 correlates the event data 212 against the security policy 211 in order to provide an indication to the interceptors 200 of whether or not the processing activity associated with the event data should be allowed. The event correlation engine 210 can also instruct the interceptors 200 to collect more or less event data 212 as needed. By being able to track operations, in the event of an undesirable processing operation, the behavior of the computer system 110 can be analyzed and the series of events that took place that lead up the undesirable processing operation can be "fingerprinted" and marked so that if they occur again, they can be prevented prior to their full execution. In addition, by recording traces from multiple failures and determining a commonality between them, if several computer systems suffer similar attacks, a commonality between the attacks can be identified and prevented in the future, even in situations where the attacking program morphs its identity or changes it content.

Further details of configurations explained herein will now be provided with respect to a flow chart of processing steps that show the high level operations disclosed herein. Unless otherwise stated, the steps described below are unordered meaning that, when possible, the steps can be performed in any convenient or desirable order.

Figure 3:
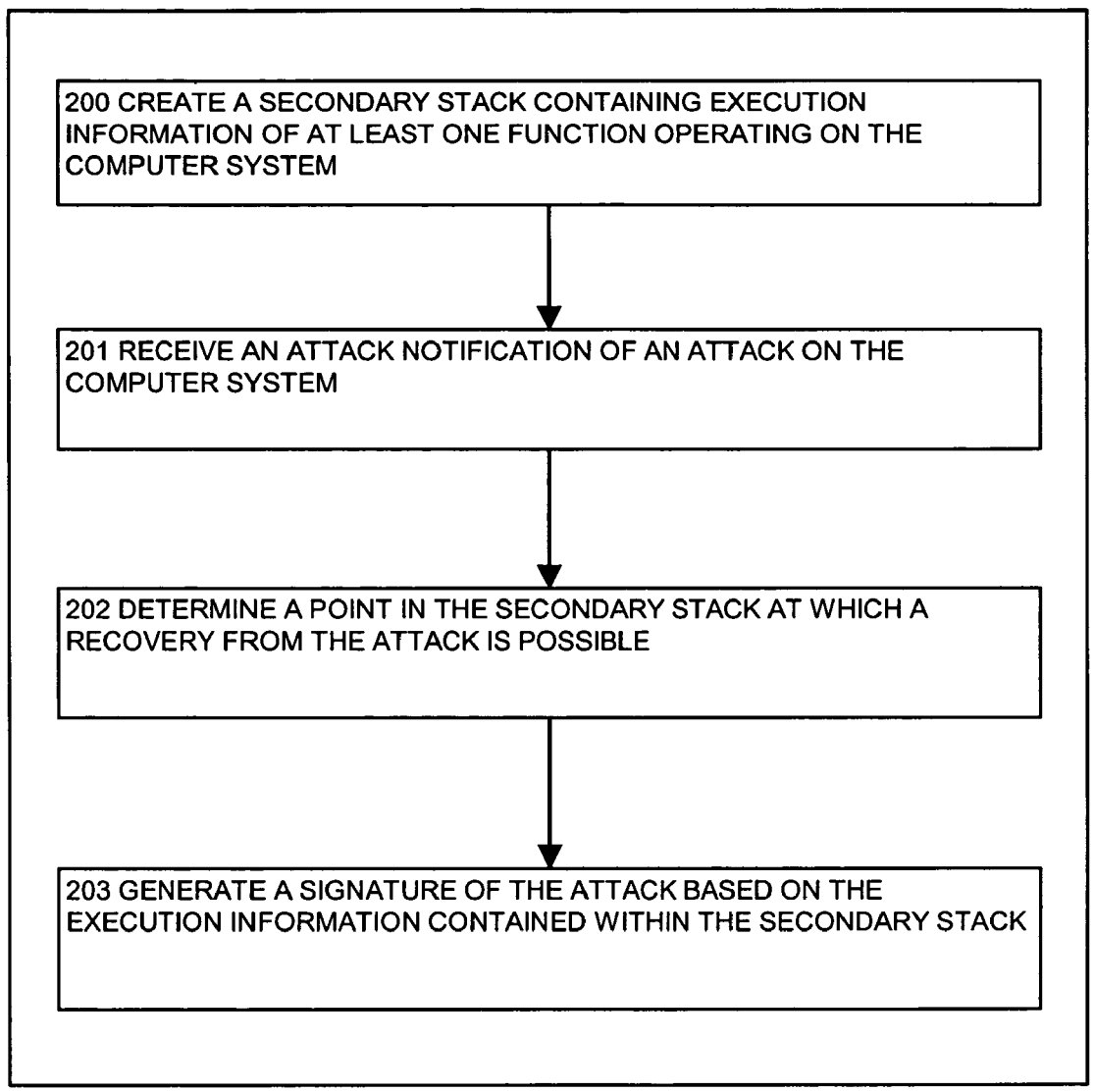
FIG. 3 illustrates a flowchart of a procedure performed by the system of FIG. 1 when the exploited process recovery technique creates a secondary stack containing execution information of at least one function operating on the computer system, according to one embodiment disclosed herein.

FIG. 3 is a flowchart of the steps performed by the exploited process recovery technique 155 when it creates a secondary stack containing execution information of at least one function operating on the computer system.

In step 200, the exploited process recovery technique 155 creates a secondary stack containing execution information of at least one function operating on the computer system. In an example embodiment, the exploited process recovery technique 155 creates a secondary stack for processes running on the computer system. The secondary stack shadows the primary stack that runs on the computer system. The exploited process recovery technique 155 creates a secondary stack, and inserts hooks into functions to provide the execution information to the secondary stack.

In step 201, the exploited process recovery technique 155 receives an attack notification of an attack on the computer system. In an example embodiment, the exploited process recovery technique 155 receives attack notification that an attack is occurring on the computer system. For example, the attack could be an exception of a critical and unrecoverable event occurring on the computer system. Other types of events that could indicate an attack on the system include (but are not limited to) a system call, a buffer overflow, an instance of downloaded content, an instance of CPU utilization, at least one network connection, a process exception, a system configuration modification, an instance of a new software program installation, an instance of a new service installation, a first time instance of a application invocation, an instance of mobile code execution, an instance of at least one root-kit detection, an instance of memory utilization, etc. In an example embodiment, the attack is an unintended failure, such as incorrectly written code executing on the computer system. In this example, the incorrectly written code does not have malicious intent, but inadvertently causes a failure on the computer system triggering the exploited process recovery technique 155.

In step 202, the exploited process recovery technique 155 determines a point in the secondary stack at which a recovery from the attack is possible. In an example embodiment, as functions execute on the computer system, the exploited process recovery technique 155 pushes and pops data associated with those executing functions on the secondary stack. After an attack occurs on the computer system, the exploited process recovery technique 155 determines a point in the secondary stack at which the executing processing can resume processing.

In step 203, the exploited process recovery technique 155 generates a signature of the attack based on the execution information contained within the secondary stack. In an example embodiment, the exploited process recovery technique 155 unwinds the execution information on the secondary stack, and utilizing that execution information, generates a signature of the attack. The signature of the attack is used to prevent further attacks on the computer system. The signature is transmitted to other computers systems within the network to prevent attacks on those systems. The computers systems on the network share the generated signatures to determine the best signature for a given attack.

FIG. 4 is a flowchart of the steps performed by the exploited process recovery technique 155 when it creates a secondary stack, and inserts a notifying identifier in one or more functions operating on the computer system.

In step 204, the exploited process recovery technique 155 creates a secondary stack containing execution information of at least one function operating on the computer system. In an example embodiment, the exploited process recovery technique 155 creates a secondary stack for processes running on the computer system. The secondary stack shadows the primary stack that runs on the computer system. The exploited process recovery technique 155 creates a secondary stack, and inserts "hooks" (i.e., notifying identifiers) into one or more functions to provide information to the secondary stack.

In step 205, the exploited process recovery technique 155 inserts a notifying identifier in the at least one function operating on the computer system, the notifying identifier providing execution information to the secondary stack, the execution information associated with the at least one function. In an example embodiment, the notifying identifier is a 'hook' that is inserted into a function, at an entry point in the function. The hook (i.e., notifying identifier) provides execution information to the secondary stack, as well as providing execution information associated with the state of the computer system at the time of entry into that function during operation of the computer system.

In step 206, the exploited process recovery technique 155 receives execution information from the notifying identifier that the at least one function has begun execution at an entry point in the at least one function. In an example embodiment, the exploited process recovery technique 155 inserts a hook (i.e., notifying identifier) into a function, at an entry point in the function. When the function is called, and begins execution, the hook (i.e., notifying identifier) provides execution information to the secondary stack. The execution information provides the exploited process recovery technique 155 with information that the function has started executing.

In step 207, the exploited process recovery technique 155 captures the execution information from the at least one function. In an example embodiment, the exploited process recovery technique 155 inserts a hook (i.e., notifying identifier) into a function, at an entry point in the function. When the function is called and begins execution, the hook (i.e., notifying identifier) provides execution information including marking information to the secondary stack. The marking information identifies that the current secondary stack location is safe to return to, should an attack occur on the computer system.

In step 208, the exploited process recovery technique 155 captures the execution information including at least one of a state of at least one register associated with the computer system, a hash of a current state of a primary stack, and a return address associated with the at least one function providing the notifying identifier. In an example embodiment, the process recovering process 155 inserts a hook (i.e., notifying identifier) into a function, at an entry point in the function. When the function is called and begins execution, the hook (i.e., notifying identifier) provides execution information including marking information to the secondary stack. The marking information can include information such as a state of at least one register associated with the computer system, a hash of a current state of a primary stack, and a return address associated with the function providing the hook. In an example embodiment, the hash of a current state is used to verify that malicious code did not corrupt the data to be restored.

In step 209, the exploited process recovery technique 155 stores the execution information from the at least one function. In an example configuration, the exploited process recovery technique 155 receives execution information including marking information from the hook (i.e., notifying identifier) associated with the function that is currently executing. The marking information is saved locally via the secondary stack that shadows the primary stack operating on the computer system.

Alternatively, in step 210, the exploited process recovery technique 155 pushes the execution information onto the secondary stack. In an example embodiment, as a function is executing on the computer system, the hook (i.e., notifying identifier) in the function provides execution information including marking information for the secondary stack. As the function begins, the marking information provides the secondary stack with entry point information associated with the function. That marking information is pushed onto the secondary stack. As the function continues to execute, additional marking information is pushed onto the secondary stack, as that marking information is provided by the hooks (i.e., notifying identifiers) within the functions on the computer system.

Figure 5:
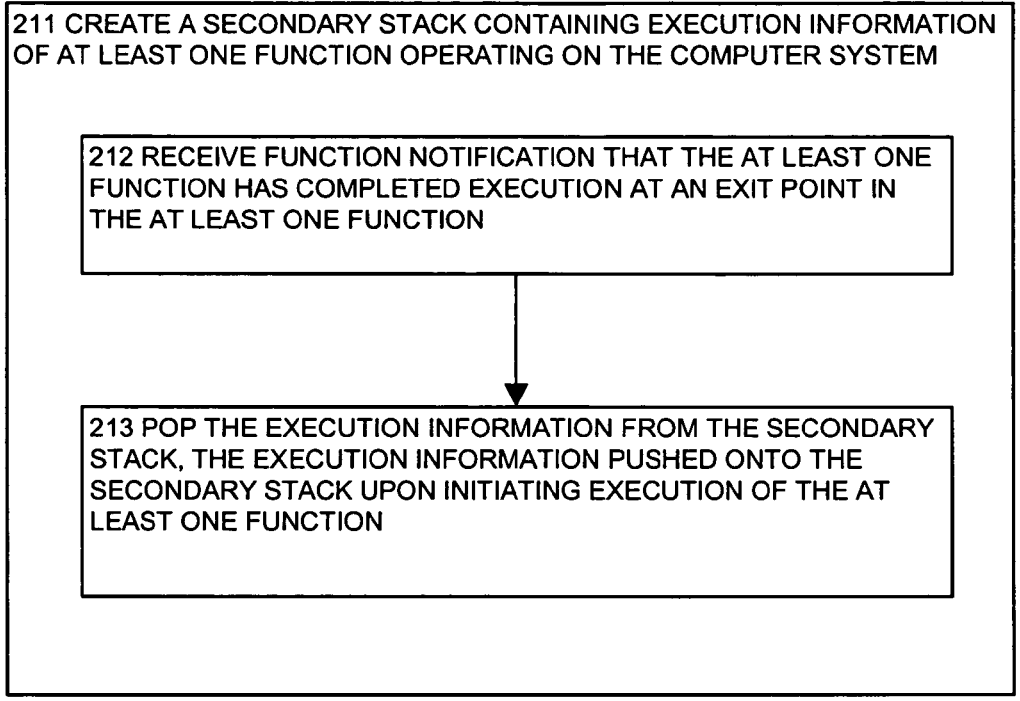
FIG. 5 illustrates a flowchart of a procedure performed by the system of FIG. 1 when the exploited process recovery technique creates a secondary stack, and receives function notification that the at least one function has completed execution at an exit point in the at least one function, according to one embodiment disclosed herein.

FIG. 5 is a flowchart of the steps performed by the exploited process recovery technique 155 when it creates a secondary stack, and receives function notification that the at least one function has completed execution at an exit point in the at least one function.

In step 211, the exploited process recovery technique 155 creates a secondary stack containing execution information of at least one function operating on the computer system. In an example embodiment, the exploited process recovery technique 155 creates a secondary stack for processes running on the computer system. The secondary stack shadows the primary stack that runs on the computer system. The exploited process recovery technique 155 creates a secondary stack, and inserts hooks (i.e., notifying identifiers) into functions to provide execution information to the secondary stack, such as an entry point an exit point of the function.

In step 212, the exploited process recovery technique 155 receives function notification that the at least one function has completed execution at an exit point in the at least one function. In an example embodiment, the exploited process recovery technique 155 inserts a hook (i.e., notifying identifier) into a function, at an entry point in the function. When the function is called and begins execution, the hook (i.e., notifying identifier) provides execution information to the secondary stack. As the function continues to execute, the hook (i.e., notifying identifier) provides execution information including marking information to the secondary stack. The marking information identifies that the current secondary stack location is safe to return to, should an attack occur on the computer system. When the function completes execution, the exploited process recovery technique 155 receives execution information including function notification that the function has completed execution at an exit point in the function.

In step 213, the exploited process recovery technique 155 pops the execution information from the secondary stack, the execution information pushed onto the secondary stack upon initiating execution of the at least one function. In an example embodiment, as a function is executing on the computer system, the hook (i.e., notifying identifier) in the function provides execution information including marking information for the secondary stack. As the function begins, the marking information provides the secondary stack with entry point information associated with the function. That marking information is pushed onto the secondary stack. As the function continues to execute, additional marking information is pushed onto the secondary stack. When the function completes execution, the exploited process recovery technique 155 receives execution information including function notification that the function has completed execution at an exit point in the function, and the exploited process recovery technique 155 pops the execution information associated with the function, from the secondary stack.

FIG. 6 is a flowchart of the steps performed by the exploited process recovery technique 155 when it determines a point in the secondary stack at which a recovery from the attack is possible.

In step 214, the exploited process recovery technique 155 determines a point in the secondary stack at which a recovery from the attack is possible. In an example embodiment, as functions execute on the computer system, the exploited process recovery technique 155 pushes and pops execution information associated with those executing functions on the secondary stack. After an attack occurs on the computer system, the exploited process recovery technique 155 determines a point in the secondary stack at which the executing processing can resume processing, if it is possible for the computer system to recover from the attack.

In step 215, the exploited process recovery technique 155 traverses the secondary stack to retrieve the execution information contained within the secondary stack. In an example embodiment, the exploited process recovery technique 155 determines an attack has occurred on the computer system, and begins to 'unwind' the stack to determine a safe point at which to resume execution. In another example embodiment, when certain violation events occur, they can result in corrupted processes and system crashes that can result in a system failure. The Local Security Authority Subsystem Service (LSASS) process is one such example. An un-handled exception in LSASS will cause the process to be terminated, and the system will reboot. Un-handled exceptions frequently occur in DoS attacks, or after exploit code has finished executing, and has left the primary stack in an indeterminate state. By hooking the process dispatching routine (i.e., inserting notifying identifiers into various functions), the exploited process recovery technique 155 attempts to unwind the secondary stack to a safe point where the code, variables, and primary stack are not corrupted, and execution may safely be resumed. For example, by hooking selected control points, and saving away proper context, the exploited process recovery technique 155 may jump to the appropriate code, safely exit processing. The exploited process recovery technique 155 can then rely on an auto-generated signature, or interface protection for preventing the exploit from occurring again. In this example, the LSASS failure may be mapped directly back to an outward facing RPC entry point. Other embodiments exist for attempting to recover. For instance, the exploited process recovery technique 155 incrementally unwinds the secondary stack, attempting to properly set error notifications, and relies upon catching further exceptions if the unwinding causes further failures. In an example configuration, the exploited process recovery technique 155 stores execution information and register information to recover from a corrupted stack. For example, when an attack causes an exception in a process, the exploited process recovery technique 155 prevents the process from transferring execution to a frame exception handler and maintaining execution of the process. For example, specially crafted malformed data can overwrite the frame exception handler pointer with a pointer to a malicious payload that then causes an exception. Using standard exception handling mechanisms, the process jumps to the payload address that would result in execution of the malicious code. The exploited process recovery technique 155 prevents this from happening by unwinding the stack to a safe recovery point in the process. In another example embodiment, a Security function (such as a notifying identifier hook, callout, etc.) allocates memory and saves data needed to unwind the stack, locally and separately for each thread of the process. Each thread uses thread index to store and retrieve the data in the memory independently of other threads. The Security function frees the memory upon successful completion of the hooked function or after recovering the stack. A method of recovering the stack can include:

1. Security software recovers the stack by changing the stack pointer to point to a saved stack location, restoring base pointer of the function frame where execution will continue and executing return instruction. It also restores registers that need to be restored.
2. Security software recovers the stack by restoring corrupted stack from saved away data.

In step 216, the exploited process recovery technique 155 identifies the secondary stack contains corrupted function information. In an example embodiment, the exploited process recovery technique 155 receives entry point information, from the notifying identifier, when the function begins execution. As the function executes, the exploited process recovery technique 155 receives additional execution information associated with the state of the system during execution of the function. When the exploited process recovery technique 155 determines an attack has occurred, the exploited process recovery technique 155 attempts to unwind the secondary stack to a safe entry point in the function. In this example, the exploited process recovery technique 155 determines that the execution information associated with the function that was executing at the time of the attack is corrupted, and the exploited process recovery technique 155 cannot unwind the secondary stack to the entry point of the function, and resume execution of the computer system.

In step 217, the exploited process recovery technique 155 determines a safe entry point in the secondary stack at which to begin execution of a second function, the second function not associated with the corrupted information contained within the secondary stack. In an example embodiment, the exploited process recovery technique 155 determines the execution information (associated with the function that was executing at the time of the attack on the computer system) pushed onto the secondary stack, is corrupted, and the exploited process recovery technique 155 cannot unwind the secondary stack back to the entry point of that function. The exploited process recovery technique 155 determines a safe entry point in the secondary stack of a second function (i.e., not the function that was executing at the time of the attack on the computer system). The exploited process recovery technique 155 then unwinds the secondary stack to the entry point of the second function to resume execution on the computer system.

Alternatively, in step 218, the exploited process recovery technique 155 utilizes the execution information to determine a safe entry point in the secondary stack at which to begin execution of the at least one function. In an example embodiment, the exploited process recovery technique 155 receives execution information including entry point information, from the notifying identifier, when the function begins execution. As the function executes, the exploited process recovery technique 155 receives additional data associated with the state of the system during execution of the function. When the exploited process recovery technique 155 determines an attack has occurred, the exploited process recovery technique 155 attempts to unwind the secondary stack to a safe entry point in the function. The exploited process recovery technique 155 utilizes the execution information to determine a safe point in the secondary stack to resume execution of the function that was executing at the time the attack occurred on the computer system.

FIG. 7 is a flowchart of the steps performed by the exploited process recovery technique 155 when it generates a signature of the attack based on the execution information contained within the secondary stack.

In step 219, the exploited process recovery technique 155 generates a signature of the attack based on the execution information contained within the secondary stack. In an example embodiment, the exploited process recovery technique 155 unwinds the execution information on the secondary stack, and utilizing that execution information, generates a signature of the attack. The signature of the attack is used to prevent further attacks on the computer system. In an example embodiment, the signature generated is considered to be a 'good enough' signature, but not an optimal signature. A 'good enough signature may prevent the attack from reoccurring (or may not), but may also prevent good traffic from flowing throughout the network. The signature is transmitted to other computers systems within the network to prevent attacks on those systems. The computers systems on the network share the generated signatures to determine the best signature for a given attack.

In step 220, the exploited process recovery technique 155 identifies the attack occurred during execution of the at least one function. In an example embodiment, the exploited process recovery technique 155 receives execution information including entry point information, from the notifying identifier, when the function begins execution. As the function executes, the exploited process recovery technique 155 receives additional execution information associated with the state of the system during execution of the function. When the exploited process recovery technique 155 determines an attack has occurred, the exploited process recovery technique 155 identifies the attack occurred during execution of the function.

In step 221, the exploited process recovery technique 155 obtains execution information to be used to generate the signature. In an example embodiment, the exploited process recovery technique 155 inserts a hook (i.e., notifying identifier) into a function, at an entry point in the function. When the function is called and begins execution, the hook provides execution information including marking information that is pushed onto the secondary stack. The marking information identifies that the current secondary stack location is safe to return to, should an attack occur on the computer system. When an attack occurs, the exploited process recovery technique 155 identifies the attack occurred during execution of the function, and obtains execution information to be used to generate the signature from the secondary stack.

In step 222, the exploited process recovery technique 155 generates a signature of the attack, the signature of the attack identifying the at least one function as the origin of the attack. In an example embodiment, the exploited process recovery technique 155 unwinds the secondary stack to obtain execution information associated with the function that was executing at the time the attack occurred on the computer system. The exploited process recovery technique 155 utilizes the execution information to generate a signature of the attack.

While the system and method have been particularly shown and described with references to configurations thereof, it will be understood by those skilled in the art that various changes in form and details may be made therein without departing from the scope of the embodiments disclosed herein encompassed by the appended claims. Accordingly, the present embodiments disclosed herein are not intended to be limited by the example configurations provided above.

What is claimed is:

1. A method, comprising:
   creating a secondary stack containing execution information of at least one function operating on a computer system by inserting a notifying identifier in the at least one function, where the notifying identifier provides execution information associated with the at least one function to the secondary stack;
   receiving execution information from the notifying identifier that the at least one function has begun execution at an entry point in the at least one function, where receiving execution information comprises capturing the execution information from the at least one function and storing the execution information from the at least one function, where the execution information includes a state of at least one register associated with the computer system, a hash of a current state of a primary stack, or a return address associated with the at least one function providing the
   notifying identifier;
   and, after the secondary stack has been created:
      receiving an attack notification of an attack on the computer system;
      determining a safe recovery point in the secondary stack at which a recovery from the attack is possible; and
      recovering an exploited process using information located at the safe recovery point in the secondary stack.

2. The method of claim 1 comprising:
   generating a signature of the attack based on the execution information contained within the secondary stack.

3. The method of claim 1 where receiving execution information from the notifying identifier that the at least one function has begun execution at an entry point in the at least one function comprises:
   pushing the execution information onto the secondary stack.

4. The method of claim 1 wherein creating a secondary stack containing execution information of at least one function operating on the computer system comprises:
   receiving function notification that the at least one function has completed execution at an exit point in the at least one function; and
   popping the execution information from the secondary stack, the execution information pushed onto the secondary stack upon initiating execution of the at least one function.

5. The method of claim 1 wherein determining a point in the secondary stack at which a recovery from the attack is possible comprises:
   traversing the secondary stack to retrieve the execution information contained within the secondary stack.

6. The method of claim 5 wherein traversing the secondary stack to retrieve the execution information contained within the secondary stack comprises:
   identifying the secondary stack contains corrupted function information; and
   determining a safe entry point in the secondary stack at which to begin execution of a second function, the second function not associated with the corrupted information contained within the secondary stack.

7. The method of claim 5 wherein traversing the secondary stack to retrieve the execution information contained within the secondary stack comprises:
   utilizing the execution information to determine a safe entry point in the secondary stack at which to begin execution of the at least one function.

8. The method of claim 1 wherein generating a signature of the attack based on the execution information contained within the secondary stack comprises:
   identifying the attack occurred during execution of the at least one function; obtaining execution information to be used to generate the signature; and
   generating a signature of the attack, the signature of the attack identifying the at least one function as the origin of the attack.

9. A computerized device comprising:
   a memory;
   a processor;
   a communications interface;
   an interconnection mechanism coupling the memory, the processor and the communications interface;
   wherein the memory is encoded with an exploited process recovery application that when executed on the processor is capable of recovering an exploited process on the computerized device by performing the operations of:
   creating a secondary stack containing execution information of at least one function operating on the computer system by inserting a notifying identifier in the at least one function, where the notifying identifier provides execution information associated with the at least one function to the secondary stack; receiving execution information from the notifying identifier that the at least one function has begun execution at an entry point in the at least one function, where receiving execution information comprises capturing the execution information from the at least one function and storing the execution information from the at least one function, where the execution information includes a state of at least one register associated with the computer system, a hash of a current state of a primary stack, or a return address associated with the at least one function providing the notifying identifier; and, after the secondary stack has been created: the computer system;
   receiving an attack notification of an attack on the computer system;

determining a safe recovery point in the secondary stack at which a recovery from the attack is possible; and recovering an exploited process using information located at the safe recovery point in the secondary stack.

10. The computerized device of claim 9 wherein when the computerized device performs the operation of receiving execution information from the notifying identifier that the at least one function has begun execution at an entry point in the at least one function, the computerized device is capable of performing the operation of:
   pushing the execution information onto the secondary stack.

11. The computerized device of claim 9 wherein when the computerized device performs the operation of creating a secondary stack containing execution information of at least one function operating on the computer system, the computerized device is capable of performing the operations of:
   receiving function notification that the at least one function has completed execution at an exit point in the at least one function; and
   popping the execution information from the secondary stack, the execution information pushed onto the secondary stack upon initiating execution of the at least one function.

12. The computerized device of claim 1 wherein when the computerized device performs the operation of determining a point in the secondary stack at which a recovery from the attack is possible, the computerized device is capable of performing the operation of:
   traversing the secondary stack to retrieve the execution information contained within the secondary stack.

13. A computer readable medium encoded with computer programming logic that when executed on a process in a computerized device recovers an exploited process, the medium comprising:
   instructions for creating a secondary stack containing execution information of at least one function operating on the computer system;
   instructions for receiving an attack notification of an attack on the computer system;
   instructions for determining a point in the secondary stack at which a recovery from the attack is possible.

14. A computerized device comprising:
   a memory;
   a processor;
   a communications interface;
   an interconnection mechanism coupling the memory, the processor and the communications interface;
   wherein the memory is encoded with a exploited process recovery application that when executed on the processor configures the computerized device with a means for recovering an exploited process, the means including:
   means for creating a secondary stack containing execution information of at least one function operating on the computer system by inserting a notifying identifier in the at least one function, where the notifying identifier provides execution information associated with the at least one function to the secondary stack; receiving execution information from the notifying identifier that the at least one function has begun execution at an entry point in the at least one function, where receiving execution information comprises capturing the execution information from the at least one function and storing the execution information from the at least one function, where the execution information includes a state of at least one register associated with the computer system, a hash of a current state of a primary stack, or a return address associated with the at least one function providing the notifying identifier;
   means for receiving an attack notification of an attack on the computer system after the secondary stack has been created;
   means for determining a safe recovery point in the secondary stack at which a recovery from the attack is possible; and means for recovering an exploited process using information located at the safe recovery point in the secondary stack.

* * * * *

UNITED STATES PATENT AND TRADEMARK OFFICE
CERTIFICATE OF CORRECTION

PATENT NO. : 7,607,041 B2  
APPLICATION NO. : 11/414810  
DATED : October 20, 2009  
INVENTOR(S) : Kraemer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this

Twelfth Day of October, 2010

David J. Kappos  
*Director of the United States Patent and Trademark Office*

UNITED STATES PATENT AND TRADEMARK OFFICE
CERTIFICATE OF CORRECTION

PATENT NO. : 7,607,041 B2
APPLICATION NO. : 11/414810
DATED : October 20, 2009
INVENTOR(S) : Jeffrey A. Kraemer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Column 16, Claim 9, Line 65, delete ": the computer system"

Column 17, Claim 13, Line 38, insert -- by inserting a notifying identifier in the at least one function, where the notifying identifier provides execution information associated with the at least one function to the secondary stack; instructions for receiving execution information from the notifying identifier that the at least one function has begun execution at an entry point in the at least one function, where receiving execution information comprises capturing the execution information from the at least one function and storing the execution information from the at least one function, where the execution information includes a state of at least one register associated with the computer system, a hash of a current state of primary stack, or a return address associated with the at least on function providing the notifying identifier -- after the first occurrence of "computer system"

Column 17, Claim 13 , Line 40, insert -- after the secondary stack has been created -- after the first occurrence of "computer system"

Column 18, Claim 13, Line 1, insert -- safe recovery -- after first occurrence of "determining a"

Column 18, claim 13, Line 2, insert -- ; and instructions for recovering an exploited process using information located at the safe recovery point in the secondary stack -- after first occurrence of possible Signed and Sealed this Second Day of November, 2010

David J. Kappos
*Director of the United States Patent and Trademark Office*